United States Patent
Jeon et al.

(10) Patent No.: US 6,651,189 B1
(45) Date of Patent: Nov. 18, 2003

(54) COMMUNICATION NETWORK DISTURBANCE MANAGEMENT METHOD USING TOP-DOWN METHOD

(75) Inventors: Hyo Seop Jeon, Taejeon (KR); Hong Beom Jeon, Taejeon (KR); Soo Kil Jeong, Taejeon (KR); Ho Suk Park, Taejeon (KR); Jeong Tae Kim, Taejeon (KR)

(73) Assignee: Korea Telecommunication Authority, Kyunggi-do (KR)

( * ) Notice: Subject to any disclaimer, the term of this patent is extended or adjusted under 35 U.S.C. 154(b) by 0 days.

(21) Appl. No.: 09/430,600

(22) Filed: Oct. 29, 1999

(51) Int. Cl.[7] ................................................ G06F 11/00
(52) U.S. Cl. ............................................. 714/43; 714/4
(58) Field of Search .............................. 714/4, 33, 41, 714/43, 703, 712; 370/216; 379/14.01

(56) References Cited

U.S. PATENT DOCUMENTS

| | | | | |
|---|---|---|---|---|
| 4,993,015 A | * | 2/1991 | Fite, Jr. ....................... 370/218 |
| 4,999,829 A | * | 3/1991 | Fite et al. .................... 370/218 |
| 5,428,619 A | * | 6/1995 | Schwartz et al. ........... 370/449 |
| 5,712,968 A | * | 1/1998 | Nakayama et al. ......... 370/216 |
| 5,914,966 A | * | 6/1999 | Bochereau ................... 714/712 |
| 5,940,480 A | * | 8/1999 | Jeon et al. ................... 370/252 |
| 6,147,965 A | * | 11/2000 | Burns et al. ................. 370/216 |
| RE37,401 E | * | 10/2001 | Yamashita et al. .......... 714/717 |
| 6,546,498 B1 | * | 4/2003 | Saegusa ......................... 714/4 |
| 6,557,112 B1 | * | 4/2003 | Shimada ........................ 714/4 |
| 2002/0007492 A1 | * | 1/2002 | Smyth et al. ................ 725/107 |

* cited by examiner

Primary Examiner—Robert Beausoliel
Assistant Examiner—Gabriel L. Chu
(74) Attorney, Agent, or Firm—Merchant & Gould, P.C.

(57) ABSTRACT

The present invention relates to a communication network disturbance management method using a top-down method which detects, analyzes and solves a problem by analyzing a quality state in regard to whole communication network lines. The disturbance management is performed in the whole communication network, thereby managing the communication network problems which are not notified by the users. In addition, the communication network problems can be managed before the user's dissatisfaction notification or disturbance generation. Moreover, the disturbance management access method is based on service quality values, and thus it is possible to manage the communication network problem causing reduction of the service quality provided to the users. As a result, the present invention can provide high quality communication service to the users using the communication network.

16 Claims, 4 Drawing Sheets

COMMUNICATION NETWORK DISTURBANCE MANAGEMENT METHOD USING TOP-DOWN METHOD

BACKGROUND OF THE INVENTION

1. Field of the Invention

The present invention relates to a communication network disturbance management method using a top-down method, and in particular to an improved method for detecting and settling disturbance in a communication network by using a top-down method.

2. Description of the Background Art

In general, communication network quality management techniques are utilized for improving quality of services provided users with and building an economical communication network.

Currently, various communication networks have been built and operated in many countries worldwide. In addition, various services are provided through the communication networks.

The users are very sensitive to quality of communication services regarding connection easiness and service stability. That is, when the user has a hard time connecting to where that user wants to be connected at a proper time, or when the user is not provided with a normal service due to noise/delay/interruption after connection, the user feels that the quality of communication service is poor.

In order to settle disturbance in the communication network, there has been a method employed for recognizing a communication network problem when the user communicates a disturbance or inconvenience for detecting a problem portion of the communication network by using the information and solving the communication network problem by analyzing a reason thereof, and a method for detecting a defect and restoring the communication network when information of disturbance resulting from the defect of constitutional elements of the communication network is notified to a communication network manager.

However, the conventional disturbance management method is a bottom-up method which solves a communication network problem after it takes place and merely settles local problems.

Accordingly, the conventional disturbance management method can solve problems which are notified by defect generation of the communication network, but cannot solve problems which are not notified, or communication network problems relating to poor service quality.

In addition, a problem is recognized and solved after generation, and thus a problem solving method is passive. As a result, it is difficult to provide a high quality communication service.

SUMMARY OF THE INVENTION

Accordingly, it is an object of the present invention to provide a communication network disturbance management method using a top-down method which can analyze a service quality state in whole communication network lines, detect a problem, analyze a reason for the problem and solve the problem.

In order to achieve the above-described object of the present invention, there is provided a communication network disturbance management method using a top-down method, including: a first step of selecting a problem line among whole communication network lines by using communication network data and a communication network operational management reference value; a second step of detecting a problem portion in regard to the selected communication network problem line; and a third step of analyzing a reason for the detected problem of the communication network and solving the problem.

In addition, there is provided a communication network disturbance management method using a top-down method, including: a first step of detecting a value of quality items regarding connection easiness and service stability in whole communication network lines, of comparing the value of the detected quality item with a previously-set communication network operational management reference value and selecting a line having a problem; a second step of detecting a problem portion of the communication network by using information regarding traffic flow of the selected problem line; and a third step of finding a reason for the problem by using a call disconnection reason code and solving the problem.

BRIEF DESCRIPTION OF THE DRAWINGS

The present invention will become understood better with reference to the accompanying drawings which are given only by way of illustration and thus are not limitative of the present invention, wherein.

DETAILED DESCRIPTION OF THE PREFERRED EMBODIMENTS

A communication network disturbance management method using a top-down method in accordance with preferred embodiments of the present invention will now be described in detail with reference to the accompanying drawings.

Figure 1:
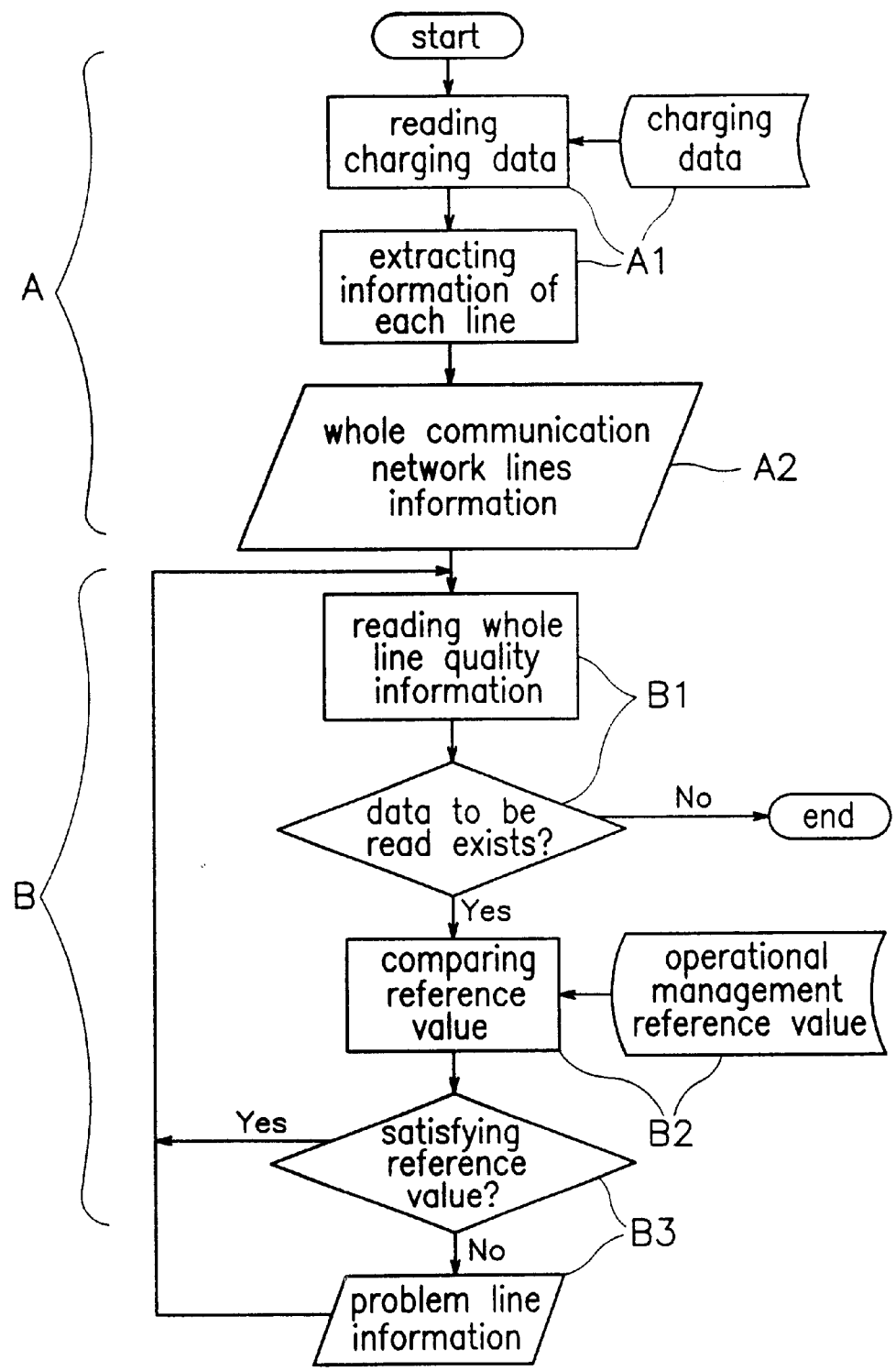
FIG. 1 is a flowchart showing sequential steps for selecting a problem line in a communication network in accordance with the present invention.

FIG. 1 is a flowchart showing sequential steps for selecting a problem line in the communication network in accordance with the present invention. 'The Korean communication packet exchange network (HiNET-P)' is exemplified in the preferred embodiments of the present invention.

Whole communication network lines information is determined by using communication network data (charging data)(A) and comparing it with a communication network operational management reference value, thereby selecting a problem line from among the whole communication network lines (B).

Here, quality items relating to connection easiness and service stability are used in order to select the problem line. A connection success rate, a connection failure rate and a virtual call disconnection rate are employed in the HiNET-P to which the embodiment of the present invention adapts. The problem line selection will now be explained in more detail.

In the step for accumulating the whole communication network lines information (A), information required to charge (sending/receiving number, facility information, transmission/reception amount, time spent on using the network) and additional information (starting date, starting/ending time, sending/receiving exchanger information, call disconnection reason information) in regard to every call using the communication network are included in the HiNET-P charging data, and thus the information on each line is extracted in regard to the whole HiNET-P lines by reading the information (A1).

In the whole communication network lines information extracting method, the information is extracted by reading all collected charging data, and by counting, in regard to every line, an attempt number, a call success number, a connection failure/virtual call disconnection number by a network side reason, time spent on using the network and a traffic matrix according to time.

Some items are computed by the following equations.

$$\text{Connection success rate} = \frac{\text{Call connection success number}}{\text{Call attempt number}}$$

Connection failure rate =

$$\frac{\text{Call connection failure number (by network side reason)}}{\text{Call attempt number}}$$

Virtual call disconnection rate =

$$\frac{\text{Virtual call disconnection number (by network side reason)}}{\text{Using time (second)}}$$

Here, the network side reasons imply problems in the communication network, such as an exchanger defect.

Whole communication network lines information consisting of a line quality information file and a traffic matrix information file is made by using the extracted information (A2).

The line quality information file includes the information of a sending/receiving call attempt number, a connection success rate, a connection failure rate and a virtual call disconnection rate, in regard to each line in the communication network. The traffic matrix information file includes the information of a sending/receiving number according to time, a connection failure number and a virtual call disconnection number by network side reasons, and the reasons.

In the step for selecting the problem line from the whole communication network lines information (B), the line quality communication file is read from the whole communication network lines information (B1). The step is finished in case the data to be read does not exist. When the data exists, it is compared with the previously-set communication network operational management reference value (B2).

Thereafter, it is judged whether the data satisfies the reference value. If so, a next data is compared with the reference value. In case the data does not satisfy the reference value, the line thereof is selected as a problem line (B3).

Here, the communication network operational management reference value is set in order to guarantee a quality value over a predetermined level to the users, in regard to three quality items (connection success rate, connection failure rate and virtual call disconnection rate). The reference value is respectively set in regard to the three quality items.

Accordingly, the line information exceeding the reference value is included in the problem line file for comparing the quality information of the whole communication network lines which is extracted in part A of FIG. 1 with the communication network operational management reference value. The problem lines exceed the operational management standard due to different reasons. Therefore, it is advantageous to perform disturbance management on the problem lines, respectively.

Figure 2:
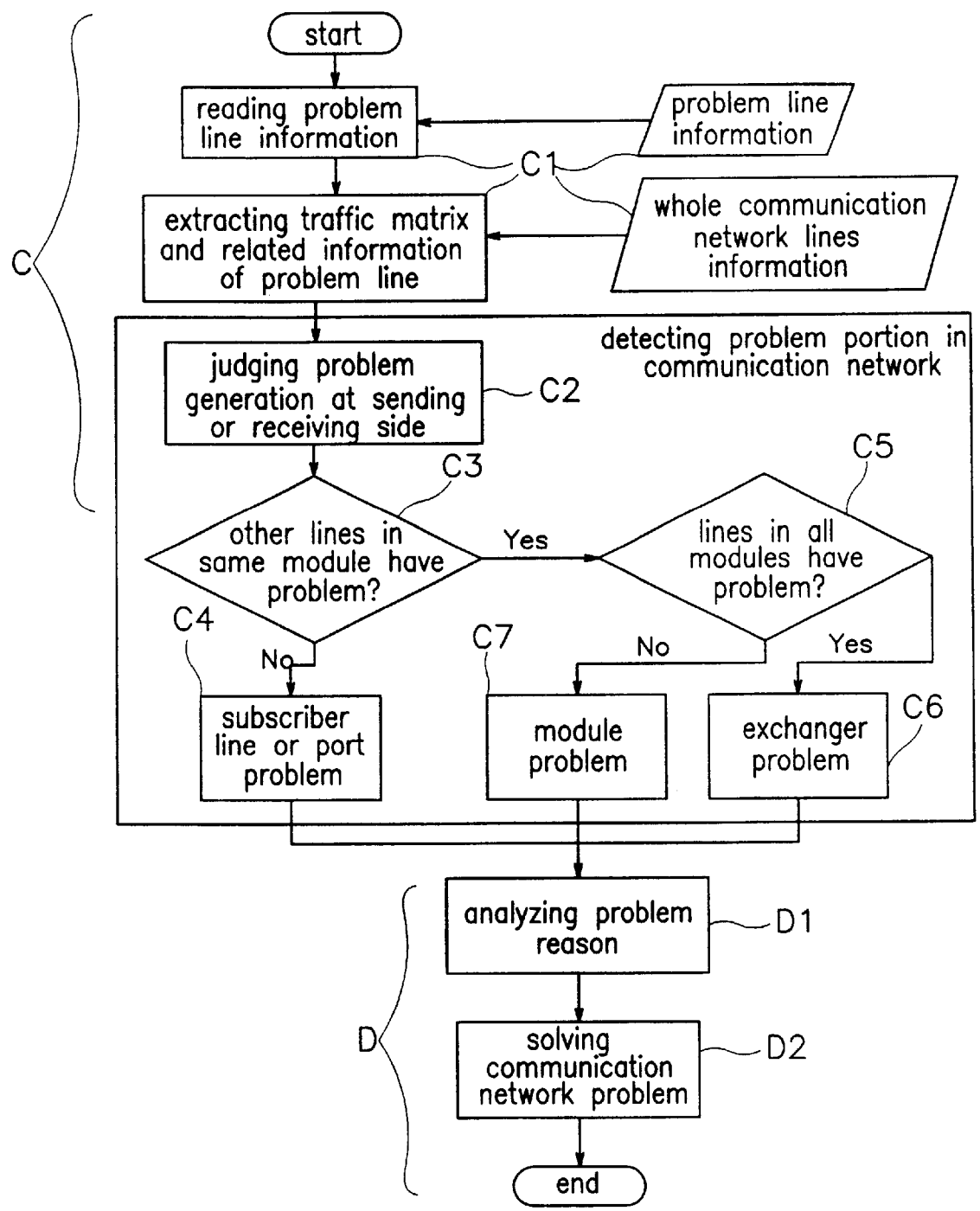
FIG. 2 is a flowchart showing sequential steps for detecting a problem portion in the communication network, analyzing a reason thereof and solving the problem in accordance with the present invention.

FIG. 2 is a flowchart showing sequential steps for detecting a problem portion in the communication network, analyzing the reason thereof and solving the problem, after the step for selecting the problem line, in accordance with the present invention.

Figure 3:
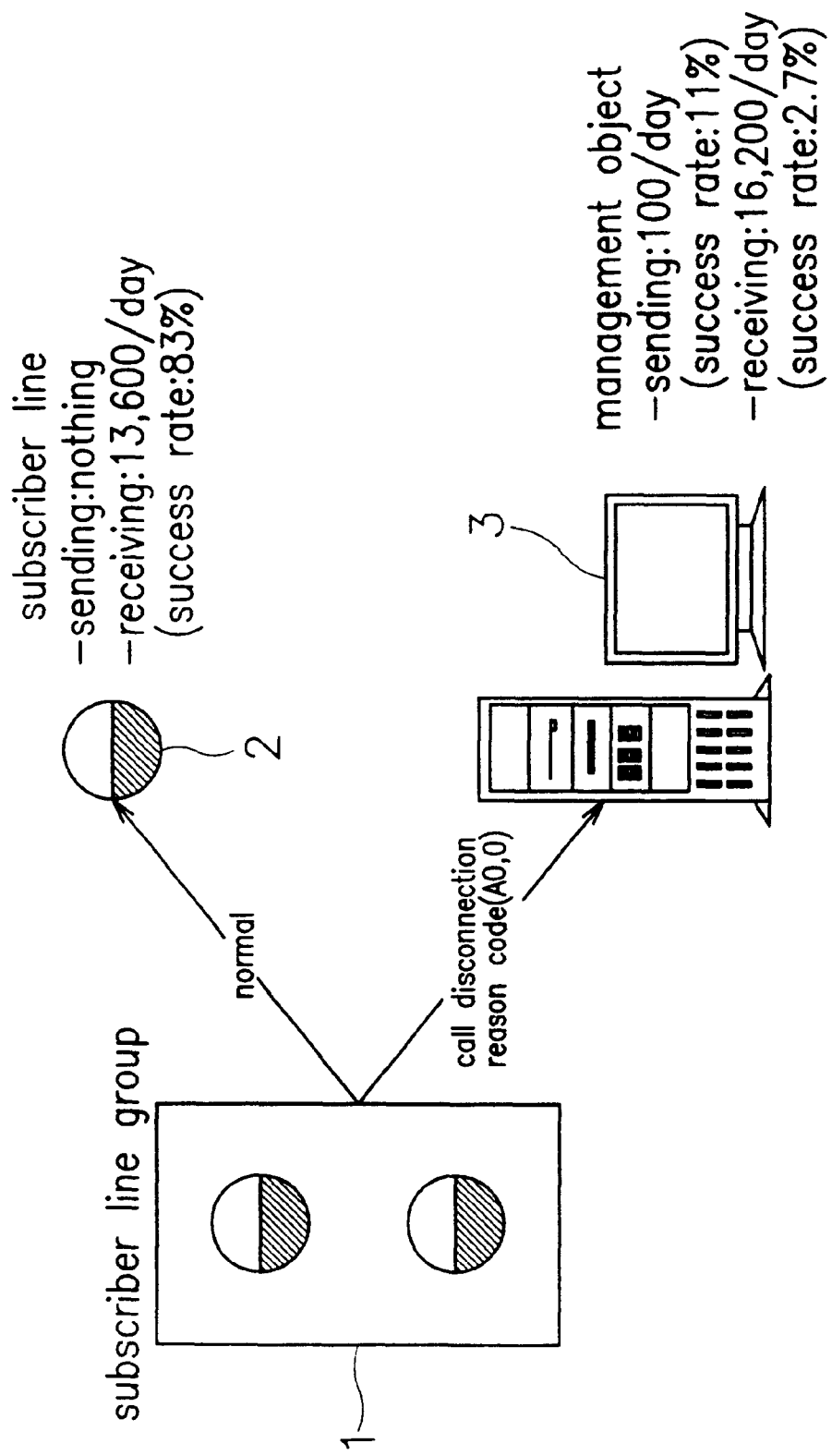
FIG. 3 is a diagram showing a result of extracting a traffic matrix and related information of a subscriber line to be managed, in accordance with the present invention.

The information regarding the problem line (hereinafter, referred to as 'object of management') is read, and the traffic matrix and related information thereof are extracted by utilizing the whole communication network lines information (C1). That is to say, as depicted in FIG. 3, when a subscriber line is selected as the object of management, the traffic flow sent/received centering around the object of management is analyzed, the traffic flow of a subscriber line group relating to the object of management is analyzed, and thereafter the information (call sending/receiving signal number, quality value . . . ) of the related subscriber lines are extracted.

After the step C1, it is judged whether a position of the problem generated from the object of management is at the sending side or the receiving side (C2), and then the detailed position of the communication network problem is determined.

The traffic matrix and the related line information of the object of management are used in judging whether the problem is generated from the sending or receiving side. That is, as illustrated in FIG. 3, a subscriber line group 1 calls both another subscriber line 2 and a subscriber line 3 selected as the object of management. In case the subscriber line group 1 calls another subscriber group 2, the connection success rate reaches to 83%. However, when calling the subscriber line 3, the connection success rate is merely 2.7%. It is thus recognized that the subscriber line 3 has a problem.

In the step for determining the detailed position of the communication network problem, properties of other lines of a module including the sending/receiving side problem line is analyzed (C3). If there is no problem, the position of the problem is judged as a disturbance relating to the subscriber line or port (C4). However, as the analysis result (C3), if another line included in the module has a problem, it is judged firstly as a problem of the module or exchanger. Here, in case a line included in every module of the exchanger has a problem (C5), it is judged as an exchanger problem (exchanger S/W, bus, common memory . . . ) (C6). In other cases, it is judged as a module problem (C7).

Figure 4:
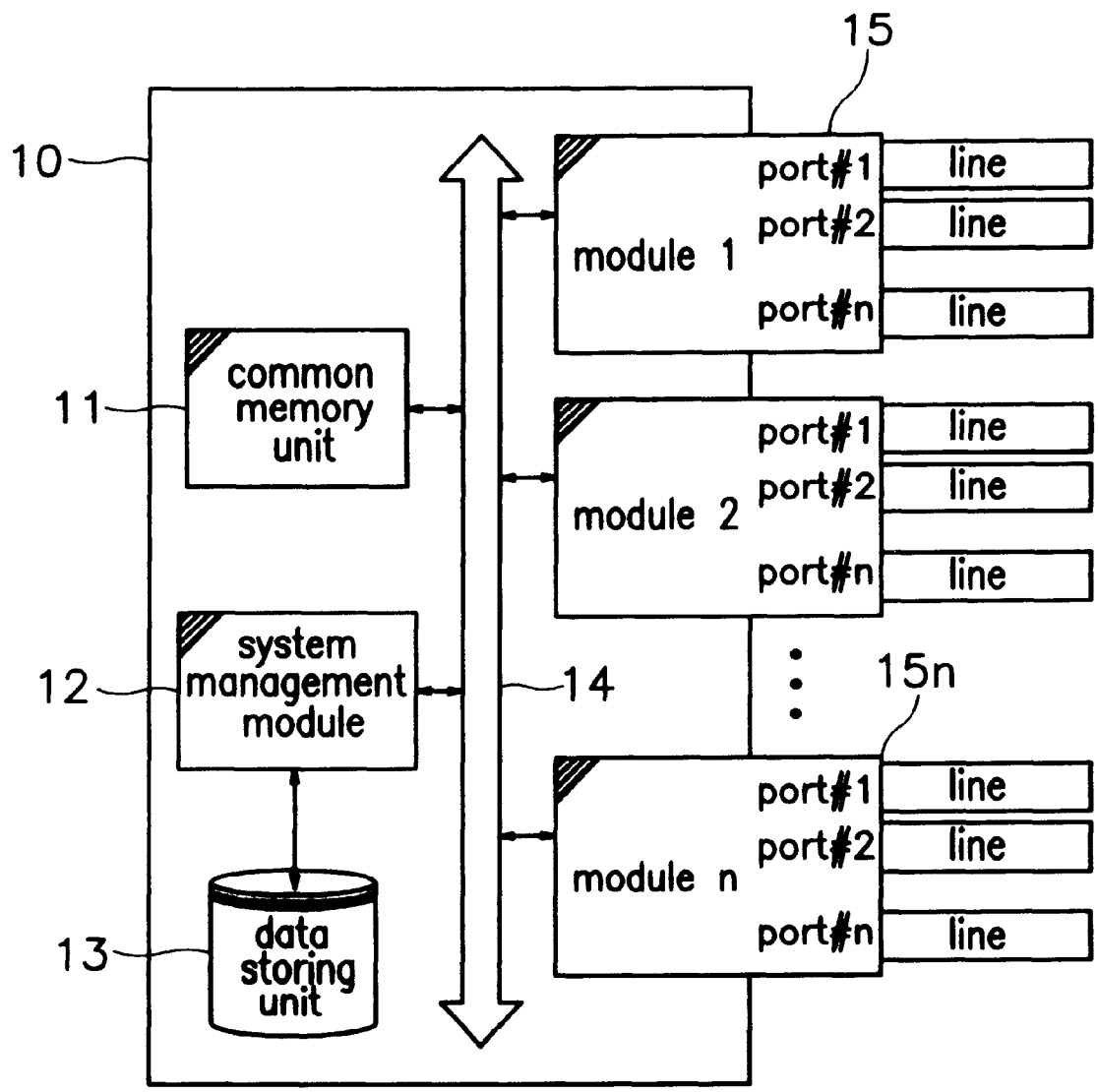
FIG. 4 is a block diagram illustrating a general structure of an exchanger to which the present invention adapts.

As the exchanger where the present invention is applied is constituted as shown in FIG. 4, the above-described step for determining the position of the communication network problem is employed. Referring to FIG. 4, the exchanger 10 includes a common memory unit 11 and a system management module 12 managing and controlling the whole operation of the exchanger 10; an exchanger data storing unit 13 storing all data relating to the exchanger 10; a system bus 14 for communication among the respective portions of the exchanger 4; and a plurality of line modules 15~15n for subscriber connection and connection with other exchangers.

On the other hand, FIG. 2 shows the step for analyzing the reason of the communication network problem portion, and for solving the problem (part D (D1, D2) in FIG. 2).

When the reasons of the communication network problem are analyzed (D1), there are employed a method for analyzing a disturbance message received in the network management system, and a method using a call disconnection reason code of a communication network using a call provided by an exchanger manufacturing company. Here, the method using the call disconnection reason code is efficient to analyze a reason of certain disturbance in the whole communication network.

The HiNET-P analyzes a call disconnection reason in regard to all the calls using the communication network and provides a result thereof as a code, thereby enabling the communication network problem reason to be exactly detected rapidly.

The representative call disconnection reason codes provided by the HiNET-P are as follows; A: temporary disturbance of the network, AE: disturbance of the network S/W, and A7: impossible to use the subscriber line.

Accordingly, since the call disconnection reason code is A0 in FIG. 3, it is judged that the reason of the communication network problem is temporary disturbance of the exchanger hardware including the receiving side subscriber line.

The communication network problem may be solved with various methods according to the reason of the problem (D2). That is, in the case of disturbance of the exchanger software or data error, it can be corrected by using the network management system. In the case of disturbance of the exchanger hardware, a related module must be replaced/repaired. In addition, in the case of an error of a subscriber terminal, the subscriber must be notified.

Referring to FIG. 3, the temporary disturbance of the exchanger may be generated due to an overload of the module including the subscriber line or a hardware error. Accordingly, the hardware must be replaced first, and thereafter the state is re-analyzed. When the identical phenomenon repeatedly takes place, a necessary step for solving the overload (distributing subscribers in the module) can be taken.

As discussed earlier, the present invention employs the communication network disturbance management method using the top-down method which detects, analyzes and solves the problem by analyzing the quality state in regard to the whole communication network, thereby overcoming the disadvantages of conventional disturbance management techniques.

That is, the communication network problem can be managed by carrying out disturbance management in the whole communication network, independently from the user's disturbance or dissatisfaction notification. In addition, in the case that a great amount of local disturbance is generated or specific disturbance is periodically generated, the present invention overcomes difficulties in disturbance detection and analysis in the communication network, and provides a solution in regard to disturbance generation in advance.

Moreover, the disturbance management access method is based on service quality values, and thus it is possible to detect the communication network problem causing reduction of the service quality provided to the users. As a result, the present invention can provide high quality communication service to the users using the communication network.

As the present invention may be embodied in several forms without departing from the spirit or essential characteristics thereof, it should also be understood that the above-described embodiments are not limited by any of the details of the foregoing description unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A disturbance management method for a communication network using a top-down method comprising:

selecting a problem line from among all lines of the communication network by using at least one of a communication network operational management reference value, line quality information, and traffic matrix information for each line;

extracting the line quality information and the traffic matrix information of the problem line;

judging whether a position of a problem for the problem line is at a sending side or a receiving side by using the extracted line quality information, and traffic matrix information, and for exactly determining the position of the problem for the problem line by using an analysis result of properties of other lines and information on whether the position of the problem for the problem line is on the sending side or the receiving side of the problem line; and analyzing a reason for the problem line of the communication network and solving the problem.

2. The method according to claim 1, wherein the selecting step comprises:

detecting information for each line in regard to the whole communication network lines by using the line quality information and the traffic matrix information; and comparing the line quality information and the traffic matrix information for each line with the communication network operational management reference value, and selecting the line which does not satisfy the operational management reference value as a problem line.

3. The method according to claim 1, wherein the line traffic matrix information comprises information of a sending/receiving call attempt number, a connection success rate, a connection failure rate and a virtual call disconnection rate, in regard to a line in the communication network.

4. The method according to claim 1, wherein the traffic matrix information comprises information of a sending/receiving number according to time, a connection failure/virtual call disconnection number by network side reasons, and the network side reasons.

5. The method according to claim 1, wherein the communication network operational management reference value is set to a predetermined reference value in regard to a connection success rate, a connection failure rate and a virtual call disconnection rate.

6. The method according to claim 1, wherein each line of the communication network includes a subscriber line and a port, and wherein a subscriber line or a port of one of said each line of the communication network is determined as the position of the problem when the analysis result in the judging step is that other lines of each line of the communication network have no problem and the sending or the receiving side of the problem line have no problem.

7. The method according to claim 1, wherein a module or an exchanger is determined as the position of the problem when the analysis result in the judging step is that other lines have a problem and the sending or the receiving side of the problem line has a problem.

8. The method according to claim 1, wherein the reason analysis of the communication network problem in the analyzing step is carried out by employing a method for analyzing a disturbance message received in the communication network.

9. The method according to claim 1, wherein the reason analysis of the communication network problem in the analyzing step is carried out by employing a method using a call disconnection reason code for the communication network using calls.

10. A disturbance management method for a communication network using a top-down method comprising:

detecting at least one of line quality information and traffic matrix information for each line regarding connection easiness and service stability in all lines of the communication network, for comparing said at least one of the line quality information and the traffic matrix information for each line with a previously-set communication network operational management reference value, and for selecting a problem line;

extracting said at least one of the line quality information and the traffic matrix information for the problem line when the problem line is selected from among all the lines of the communication network;

judging whether a position of a problem for the problem line is at a sending side or a receiving side by using the extracted said at least one of line quality information and the traffic matrix information, and for exactly determining the position of the problem according to an analysis result of properties of other lines and information on whether the position of the problem for the problem line is on the sending side or the receiving side of the problem line; and finding a reason for the problem line by using a call disconnection reason code provided by the communication network, and solving the problem.

11. The method according to claim 10, wherein the detecting step comprises:

extracting the line quality information and the traffic matrix information for each line in the whole communication network lines by using information in data from the communication network; and determining the problem line from information which does not satisfy the communication network operational management reference value.

12. The method according to claim 10, wherein the line quality information comprises information of a sending/receiving call attempt number, a connection success rate, a connection failure rate and a virtual call disconnection rate, in regard to each line in the communication network.

13. The method according to claim 10, wherein the traffic matrix information comprises information of a sending/receiving number according to time, a connection failure/virtual call disconnection number by network side reasons, and the network side reasons.

14. The method according to claim 10, wherein the communication network operational management reference value is set to a predetermined reference value in regard to a connection success rate, a connection failure rate and a virtual call disconnection rate.

15. The method according to claim 1, wherein each line of the communication network includes a subscriber line and a port, and wherein a subscriber line or a port of one of said each line of the communication network is determined as the position of the problem when the analysis result in the judging step is that other lines of each line of the communication network have no problem and the sending or the receiving side of the problem line have no problem.

16. The method according to claim 1, wherein a module or an exchanger is determined as the position of the problem when the analysis result in the judging step is that other lines have a problem and the sending or the receiving side of the problem line has a problem.

* * * * *